US012595421B2

(12) United States Patent (10) Patent No.: US 12,595,421 B2
Pendray et al. (45) Date of Patent: Apr. 7, 2026

(54) ENHANCEMENTS FOR LOW COST AUTOTHERMAL PYROLYZER

(71) Applicant: CUMMINS INC., Columbus, IN (US)

(72) Inventors: John Robert Pendray, Blaine, MN (US); Gregory J. Mitchum, Franklin, IN (US)

(73) Assignee: Cummins Inc., Columbus, IN (US)

( * ) Notice: Subject to any disclaimer, the term of this patent is extended or adjusted under 35 U.S.C. 154(b) by 246 days.

(21) Appl. No.: 18/388,941

(22) Filed: Nov. 13, 2023

(65) Prior Publication Data

US 2024/0076554 A1 Mar. 7, 2024

Related U.S. Application Data

(63) Continuation of application No. PCT/US2022/029200, filed on May 13, 2022.

(60) Provisional application No. 63/188,809, filed on May 14, 2021.

(51) Int. Cl.
| | |
|---|---|
| *C10B 49/06* | (2006.01) |
| *B01J 6/00* | (2006.01) |
| *C10B 53/02* | (2006.01) |

(52) U.S. Cl.
CPC ............... *C10B 49/06* (2013.01); *B01J 6/008* (2013.01); *C10B 53/02* (2013.01)

(58) Field of Classification Search
CPC ........... C10B 49/06; C10B 53/02; B01J 6/008
See application file for complete search history.

(56) References Cited

U.S. PATENT DOCUMENTS

| | | | |
|---|---|---|---|
| 3,721,608 A | 3/1973 | Saller et al. | |
| 3,841,851 A | 10/1974 | Kaiser | |
| 4,225,392 A * | 9/1980 | Taylor ....................... | C10B 1/04 |
| | | | 48/85 |
| 4,659,340 A | 4/1987 | Weaver | |
| 8,558,044 B2 | 10/2013 | Smaidris | |
| 9,321,966 B2 * | 4/2016 | Wang ....................... | C10B 57/02 |
| 9,375,694 B2 | 6/2016 | Potgieter et al. | |

(Continued)

FOREIGN PATENT DOCUMENTS

| | | |
|---|---|---|
| CN | 102803445 A | 11/2012 |
| CN | 111748363 A | 10/2020 |

(Continued)

OTHER PUBLICATIONS

Supplementary Search Report for EP Application No. EP 22808409 dated Feb. 24, 2025.
International Search Report and Written Opinion for PCT Application No. PCT/US2022/029200, dated Oct. 18, 2022.

(Continued)

*Primary Examiner* — Jonathan Miller
(74) *Attorney, Agent, or Firm* — Foley & Lardner LLP

(57) ABSTRACT
A system for generating biochar includes a reactor body with a wall defining a substantially cylindrical shape and comprising a first end positioned opposite a second end and defining an opening extending through the reactor body. A conduit is positioned within the reactor body, extends across the opening, and defines a slot configured to direct a fluid toward the first end. An extraction cone is coupled with the first end of the reactor body and is configured to direct biochar away from the reactor body. A cover is coupled with the second end of the reactor body and is configured to direct exhaust gas away from the reactor body.

18 Claims, 3 Drawing Sheets

(56)          References Cited

U.S. PATENT DOCUMENTS

|  |  |  |  |  |
|---|---|---|---|---|
| 9,534,180 | B2 * | 1/2017 | Dowaki | C10B 53/02 |
| 10,059,882 | B2 | 8/2018 | Sanderson et al. | |
| 12,343,718 | B2 * | 7/2025 | Pendray | C10B 41/04 |
| 2012/0017510 | A1 * | 1/2012 | Leveson | C10J 3/26 |
| | | | | 126/152 B |
| 2012/0305380 | A1 * | 12/2012 | Wang | C10B 53/02 |
| | | | | 202/99 |
| 2016/0326437 | A1 | 11/2016 | Wang et al. | |
| 2017/0203469 | A1 * | 7/2017 | Cartier | B28C 5/166 |
| 2020/0188812 | A1 | 6/2020 | Galyuk | |
| 2023/0103111 | A1 * | 3/2023 | Pendray | G01F 23/32 |
| | | | | 201/1 |
| 2023/0279296 | A1 * | 9/2023 | Schuster | C10B 3/02 |
| | | | | 202/120 |

FOREIGN PATENT DOCUMENTS

| | | | |
|---|---|---|---|
| EP | 2 589 870 A1 | 5/2013 |
| GB | 1 375 635 A | 7/1972 |
| WO | WO-2012/096900 A2 | 7/2012 |

OTHER PUBLICATIONS

Olson, Water Flows from Slotted Pipes Apr. 1981; Web. doi: 10.2172/6601891. [retrieved Aug. 17, 2022]. retrieved from the Internet: https://www.osti.gov/biblio/6601891-water-flows-from-slotted-pipes; pp. 4 and 9.
Office Action for CN Application No. 2022800327001, dated Nov. 17, 2025.

* cited by examiner

400

Introduce biomass
into reactor body ⟋ 402

Heat biomass by
directing hot air into
reactor body ⟋ 404

Convert hot air into
hot gas ⟋ 405

Direct gas byproduct
through the top
portion ⟋ 406

Maintain biochar at
elevated
temperature ⟋ 407

Cool biochar ⟋ 408

Direct biochar
through the
extraction body ⟋ 410

ENHANCEMENTS FOR LOW COST AUTOTHERMAL PYROLYZER

CROSS-REFERENCE TO RELATED PATENT APPLICATIONS

This application is a continuation of PCT Application No. PCT/US2022/029200, filed May 13, 2022, which claims priority to and the benefit of U.S. Provisional Patent Application No. 63/188,809, filed May 14, 2021, the content of which is herein incorporated by reference in its entirety.

TECHNICAL FIELD

The present disclosure relates to the production of biochar in an autothermal pyrolyzer system.

BACKGROUND

Biochar is a substance that is produced by heating organic material from agricultural and forestry wastes (also called biomass) in a controlled, oxygen deficient process called pyrolysis. Biochar can be used, for example, as fuel, as a soil additive, for filtration purposes, and to store atmospheric, carbon. During pyrolysis, the biomass is burned in a container with very little oxygen. As the biomass is heated, it releases pyrolytic gases and is eventually converted into biochar. To prevent the biomass from being converted to slag instead of biochar, the temperature of the pyrolysis process must be well controlled. The resulting pyrolytic gases can be burned cleanly to avoid pollution and potentially provide heat.

SUMMARY

One embodiment relates to a system for generating biochar. The system includes a reactor body with a wall comprising a first end positioned opposite a second end and defining an opening extending through the reactor body. An extraction cone is coupled with the first end of the reactor body and is configured to direct biochar away from the reactor body. A cover is coupled with the second end of the reactor body and is configured to direct exhaust gas away from the reactor body. A conduit is positioned within the reactor body, extends across the opening, and includes a first surface and a second surface. The first surface defines a slot through which fluid flows, and the second surface is positioned opposite the first surface and between the first surface and the cover.

Another embodiment relates to a method for generating biochar. The method includes introducing a biomass into a reactor body via a biomass inlet in communication with the reactor body, heating the biomass and converting the biomass into biochar and biogas by directing hot air into the reactor body via a conduit, directing the biogas from the reactor body towards a gas collection portion, maintaining the biochar at an elevated temperature for a period of time by directing hot air into the reactor body via the conduit to remove impurities in the biochar, cooling the biochar in the reactor body or an extraction cone coupled to the reactor body, and directing the biochar through the extraction cone via a first metering device.

DETAILED DESCRIPTION

Following below are more detailed descriptions of methods, apparatuses, and systems for producing biochar in an autothermal pyrolyzer system. The methods, apparatuses, and systems introduced above and discussed in greater detail below may be implemented in any of numerous ways, as the described concepts are not limited to any particular manner of implementation. Examples of specific implementations and applications are provided primarily for illustrative purposes.

To produce biochar in a biochar production system (e.g., an autothermal pyrolyzer, gasifier, etc.), biomass is introduced into a reaction core where it is heated to the point where the biomass is converted to biochar (e.g., a pyrolysis temperature). The reaction also causes the biomass to release gases as it is converted to biochar. The gases exit the top of the biochar production system and can be used as fuel. The biochar exits the bottom of the biochar production system and can be used as fuel, as a soil additive, for filtration purposes, and it can also be used to store atmospheric carbon.

In a conventional biochar production system, biomass is heated by an exothermic reaction between the biomass and air. Such conventional systems typically use a plurality of nozzles to inject air into the reaction core. Using nozzles to inject air into the reaction core can cause areas of very high temperature in the reactor core because nozzles typically inject air at high velocities. When biomass is subjected to those very high temperatures (for example, a temperature greater than 700 degrees Celsius), the non-volatile components of the biomass may be converted to slag (a glass-like byproduct) instead of biochar.

Embodiments described herein provide a system for reliably producing biochar while avoiding air injection temperatures that cause slagging. In various embodiments, conduits deliver hot air to the reactor core via passages extending through the conduits. The conduits include slots directed toward the bottom of the reactor core. The ratio of the cross-sectional area of the slot to the cross-sectional area of the passage promotes steady flow of air into the reactor core to avoid high temperature zones that cause slagging.

It should be understood that, while the description and Figures herein are primarily directed to systems for producing biochar in an autothermal pyrolyzer system, this description is not meant to be limiting. The systems described herein are also applicable to accomplish other effects.

Figure 1:
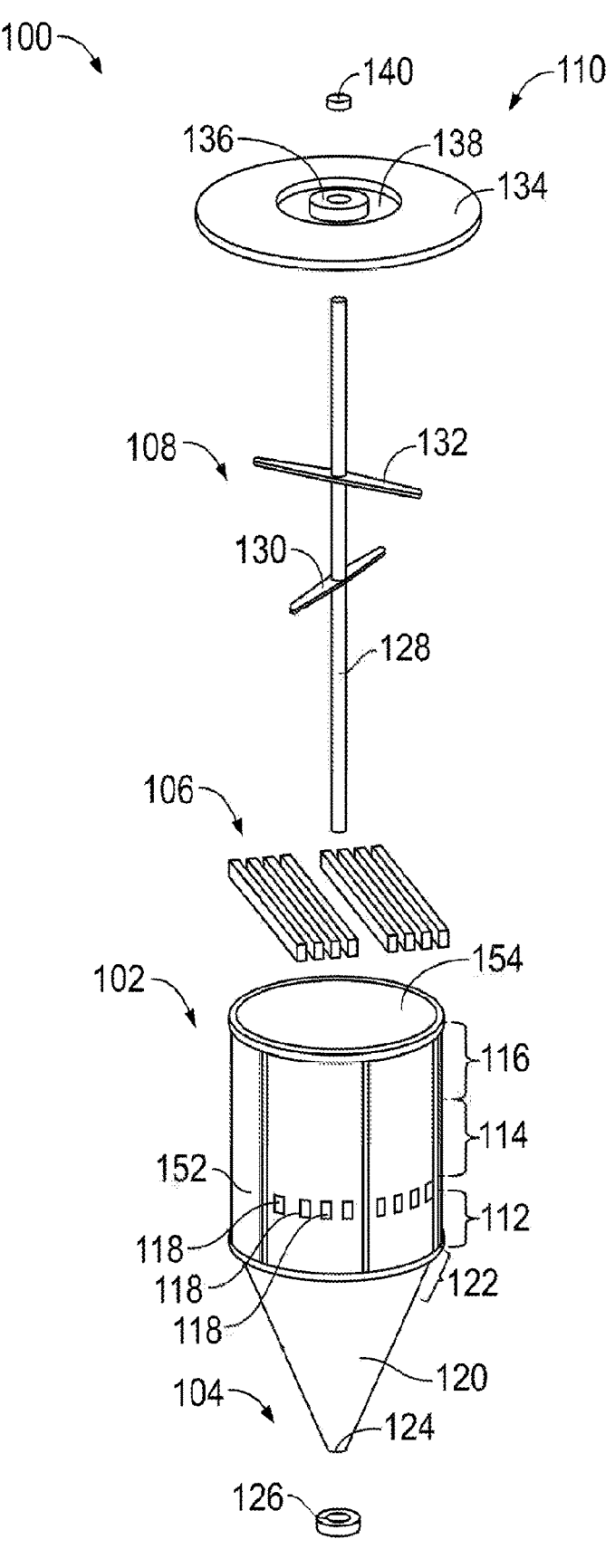
FIG. 1 is an illustration of an exploded view of a biochar production system, according to a particular embodiment.

Referring now to FIG. 1, an illustration of an exploded view of a biochar production system 100 is shown, according to a particular embodiment. The biochar production system 100 includes a reactor body 102, an extraction body 104, a conduit manifold 106, an agitator 108, and a top portion 110.

The reactor body 102 is generally cylindrical with a substantially circular cross-sectional shape, and includes an outer wall 152 and an inner wall 154. A plurality of apertures 118 extend entirely through the outer wall 152 and the inner wall 154. For each aperture 118, there is a corresponding aperture 118 positioned substantially across from the respective aperture 118 such that a component passing straight through the aperture 118 will also pass through the corresponding aperture 118. As shown, the reactor body 102 includes sixteen apertures 118 with eight pairs of apertures 118 each positioned substantially across from each other. In various embodiments, the number of apertures 118 may be greater than or less than sixteen and may be chosen based on various characteristics (e.g., desired temperature, desired flowrate, size of the reactor body 102, etc.).

The reactor body 102 defines various zones in which different processes occur. A bake zone 112 is located below the apertures 118 and adjacent to a first end of the reactor body 102, and is the area of the reactor body 102 where the temperature is maintained above the pyrolysis temperature. An oxidation zone 114 is positioned above the apertures 118 and is the portion of the reactor body 102 in which oxygen is introduced to the biomass. The oxidation zone 114 is generally the hottest zone in the biochar production system 100. A pyrolysis zone 116 is positioned above the oxidation zone 114 and adjacent to a second end of the reactor body 102. The pyrolysis zone 116 is the portion of the reactor body 102 in which the biomass is heated in the absence of oxygen. In some embodiments, the reactor body 102 defines a receiving portion (not shown) configured to direct biomass from an external location into the reactor body 102.

The extraction body 104 is coupled with the reactor body 102 at the first end of the reactor body 102 and is shown to include an extraction cone 120, an outlet 124, and an outlet cap 126. The extraction cone 120 comprises a generally hollow cone shape that is configured to direct biochar away from the reactor body 102 and out of the biochar production system 100 through the outlet 124. The outlet cap 126 is configured to selectively attach to and detach from the outlet 124, such that (i) when the outlet cap 126 is attached to the outlet 124, the biochar is not allowed to leave the extraction cone 120 through the outlet 124, and (ii) when the outlet cap 126 is detached from the outlet 124, the biochar is allowed to leave the extraction cone 120 through the outlet 124. The extraction body 104 defines a quench zone 122 positioned adjacent to the reactor body 102. In some embodiments, the quench zone 122 is positioned within the reactor body 102. The quench zone 122 is configured to introduce a coolant (e.g., water) to the biochar to cool the biochar to a temperature below approximately one hundred degrees Celsius such that the biochar can be handled by an operator after the biochar exits the biochar production system 100.

In some embodiments, the extraction body 104 includes a metering device (not shown) to direct biochar out of the outlet 124. For example, the metering device may include a rotatable augur that directs biochar out of the outlet 124 as it rotates. The metering device may also include a conveyor system to direct biochar out of the outlet 124.

The conduit manifold 106 includes a plurality of conduits configured to interface with the apertures 118 of the reactor body 102 such that the reactor body 102 supports the plurality of conduits. The conduit manifold 106 is configured to introduce air into the reactor body 102 via the plurality of conduits. The conduit manifold 106 is further described with reference to FIGS. 2-3.

The top portion 110 is coupled to the second end of the reactor body 102 and is configured to direct gases away from the reactor body 102. The top portion 110 is shown to include a cover 134, a bearing 136, and a bearing cap 140. The cover 134 comprises a generally circular shape that substantially matches the shape of the second end of the reactor body 102. The bearing 136 is configured to interface with the agitator 108 to facilitate rotation of the agitator 108, and the bearing cap 140 interfaces with the bearing 136. In some embodiments, the cover 134 and the bearing 136 define a space 138 therebetween through which gases from the biochar production process are directed. A pipe or other similar device (e.g., channel, tube, duct, etc.) may be coupled with the cover and extend from the space to direct the gases to another location for collection.

The agitator 108 is coupled to the bearing 136 and is configured to disrupt the biomass in the reactor body 102. As shown, the agitator 108 includes a rod 128, a first protrusion 130, and a second protrusion 132. The agitator 108 may be coupled to a motor that causes the rod 128 to rotate about its vertical axis such that the first protrusion 130 and the second protrusion 132 contact the biomass as the rod 128 rotates to disrupt the biomass located in the reactor body 102. The first protrusion 130 is coupled to the rod 128 at a first obtuse angle relative to the vertical axis of the rod 128 and the second protrusion 132 is coupled to the rod 128 at a second obtuse angle relative to the vertical axis of the rod 128. In an exemplary embodiment, the first obtuse angle is larger than the second obtuse angle.

In some embodiments, a controller (not shown) is coupled with the biochar production system 100 to control operation of the biochar production system 100. The controller determines, based on various characteristics (e.g., temperature in various locations, biomass temperature, biochar temperature, etc.), the rate at which biomass is introduced to the biochar production system 100 and the rate at which biochar is directed away from the biochar production system 100. For example, the controller may determine that a temperature of the oxidation zone 114 is too hot and may therefore direct the biomass to be introduced and the biochar extracted at a faster rate such that the cooler biomass moves closer to the oxidation zone 114, thereby reducing the temperature of the oxidation zone 114.

Figure 2:
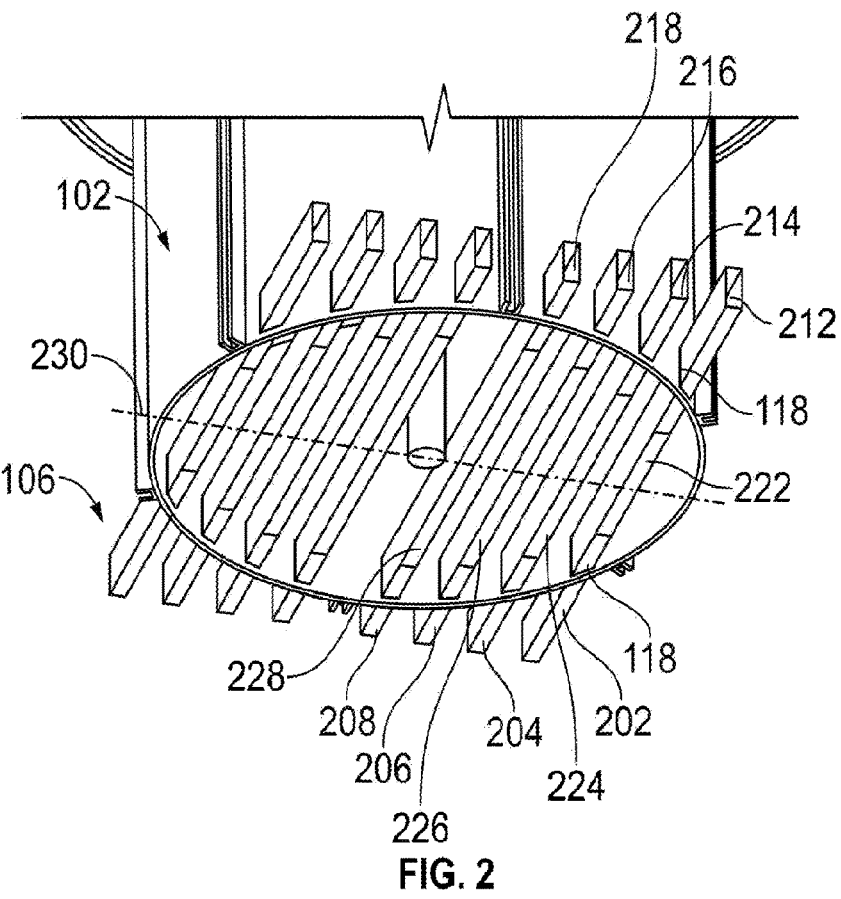
FIGS. 2-3 are illustrations of the conduit manifold of the biochar production system of FIG. 1.
Figure 3:
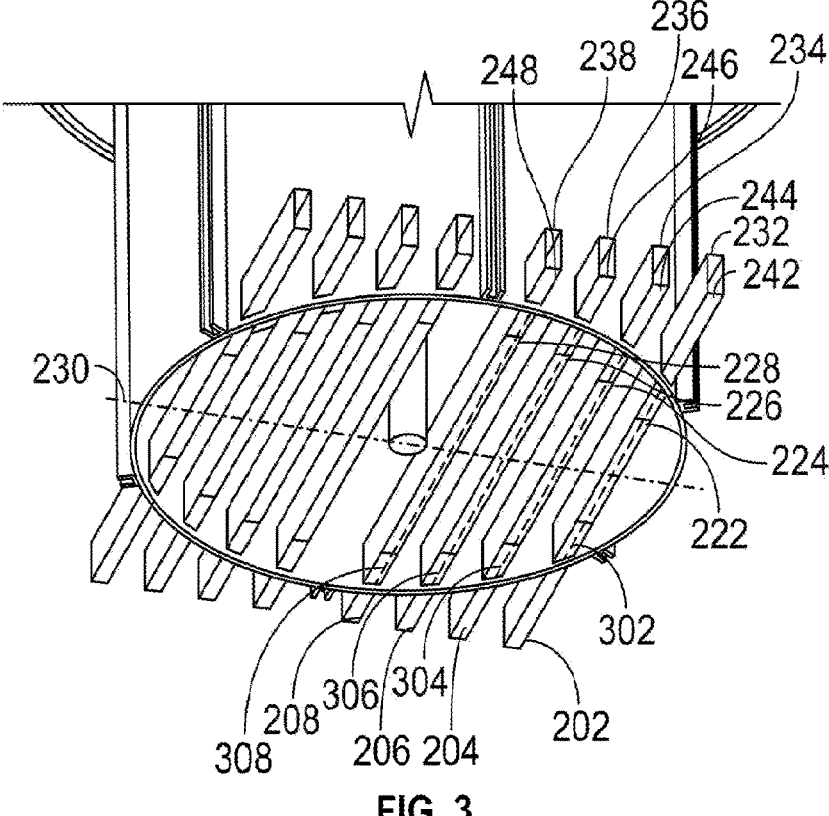

FIGS. 2-3 are illustrations of the conduit manifold 106 of the biochar production system 100 of FIG. 1. As shown, the conduit manifold 106 includes a first conduit 202, a second conduit 204, a third conduit 206, and a fourth conduit 208 (collectively referred to herein as "conduits 202-208"), and additional conduits that do not include numerals. The additional conduits are substantially similar to the conduits 202-208, therefore the following discussion of the conduits 202-208 applies to the additional conduits as well. Furthermore, although eight conduits are shown in FIGS. 2-3, one of skill in the art would understand that more or fewer conduits may be used.

The conduits 202-208 are shown coupled with the reactor body 102 and extending through the apertures 118. Each of the conduits 202-208 comprises a rectangular cross-sectional shape that defines a hollow passage extending through the conduits 202-208. For example, the first conduit 202 defines a first passage 212, the second conduit 204 defines a second passage 214, the third conduit 206 defines a third passage 216, and the fourth conduit 208 defines a fourth passage 218 (collectively referred to herein as "passages 212-218"). Furthermore, each of the conduits 202-208 comprises a top surface and a bottom surface, where the top surface is positioned between the bottom surface and the top portion 110. For example, the first conduit 202 includes a first top surface 232 and a first bottom surface 242, the second conduit 204 includes a second top surface 234 and a second bottom surface 244, the third conduit 206 includes a third top surface 236 and a third bottom surface 246, and the fourth conduit 208 includes a fourth top surface 238 and a fourth bottom surface 248. Each of the conduits 202-208 is coupled to a fluid source such that fluid (e.g., air, etc.) is directed through each of the conduits 202-208 via the passages 212-218.

While the conduits 202-208 are shown as each comprising a rectangular cross-sectional shape, in various embodiments the conduits 202-208 may comprise different cross-sectional shapes (e.g., circular, oval, square, etc.). Furthermore, although the conduits 202-208 are shown as comprising the same cross-sectional shapes, each of the conduits 202-208 are not required to comprise the same cross-sectional shapes. For example, in some arrangements the first conduit 202 may comprise a rectangular cross-sectional shape, the second conduit 204 may comprise a square cross-sectional shape, the third conduit 206 may comprise a circular cross-sectional shape, and the fourth conduit 208 may comprise an oval cross-sectional shape.

Because the reactor body 102 comprises a circular cross-sectional shape, the length of each of the conduits 202-208 that extend within the reactor body 102 are different. For instance, the length of each of the conduits 202-208 within the reactor body 102 is equal to the length of the chord extending between the apertures 118. As shown in FIG. 3, the length of the first conduit 202 within the reactor body 102 is equal to a first chord length 302, the length of the second conduit 204 within the reactor body 102 is equal to a second chord length 304, the length of the third conduit 206 within the reactor body 102 is equal to a third chord length 306, and the length of the fourth conduit 208 within the reactor body 102 is equal to a fourth chord length 308 (collectively referred to herein as "chord lengths 302-308").

Furthermore, and as shown in FIG. 2, each of the conduits 202-208 defines a slot through which fluid (e.g., air) can flow. For example, the first conduit 202 defines a first slot 222 extending through the first bottom surface 242, the second conduit 204 defines a second slot 224 extending through the second bottom surface 244, the third conduit 206 defines a third slot 226 extending through the third bottom surface 246, and the fourth conduit 208 defines a fourth slot 228 (collectively referred to herein as "slots 222-228") extending through the fourth bottom surface 248. As shown, the relative sizes of the slots 222-228 are different (e.g., the fourth slot 228 is the largest and the first slot 222 is the smallest). However, in some embodiments the relative sizes of the slots 222-228 are the same. For instance, each of the slots 222-228 may be substantially the same size as the first slot 222. In addition, subgroups of the slots 222-228 may be the same sizes. For example, the first slot 222 and the second slot 224 may be a first size and the third slot 226 and the fourth slot 228 may be a second size that is larger than the first size. Each of the slots 222-228 is positioned such that air flows toward the extraction body 104 (to prevent biomass from entering the slots 222-228 and clogging the slots 222-228) before rising toward the top portion of the biochar production system 100. Furthermore, each one of the slots 222-228 is positioned with sufficient space between adjacent slots to allow biochar to pass through spaces between the slots 222-228 to reach the extraction body 104.

Furthermore, the position of the slots 222-228 along the respective chord lengths 302-308 is shown in FIGS. 2-3 as being symmetric across the line 230. However, in various embodiments the position of the slots 222-228 may shift along the respective chord lengths 302-308 such that the position of the slots 222-228 is not symmetric across the line 230.

Regardless of the actual area and position of the slots 222-228, the slots 222-228 are sized to allow air to flow into the reactor body in a smooth (e.g., non-turbulent) fashion, thereby preventing various areas of the reactor body 102 from becoming too hot and generating slag instead of biochar. Accordingly, the size of the slots 222-228 may be adjusted to cause a ratio of the area of the slots 222-228 to the area of the passages 212-218 to be larger than a threshold ratio, thereby allowing for the smooth flow of air.

According to various particular implementations and embodiments, the average velocity of air entering the reactor body 102 may be approximately 4 meters per second and the average pressure within the passages 212-218 may be approximately 50 Pascals. However, various characteristics of the biochar production system 100 can be modified based on the size of the reactor body 102 to achieve the desired biochar output. For example, the pressure of the air flowing into the reactor body 102 may be increased while maintaining the same area of the slots 222-228, which would cause a subsequent increase in air velocity. The area of the slots 222-228 may also be varied to affect a change in air velocity. For example, decreasing the area of the slots 222-228 while maintaining the same air pressure will result in an increase in air velocity.

Figure 4:
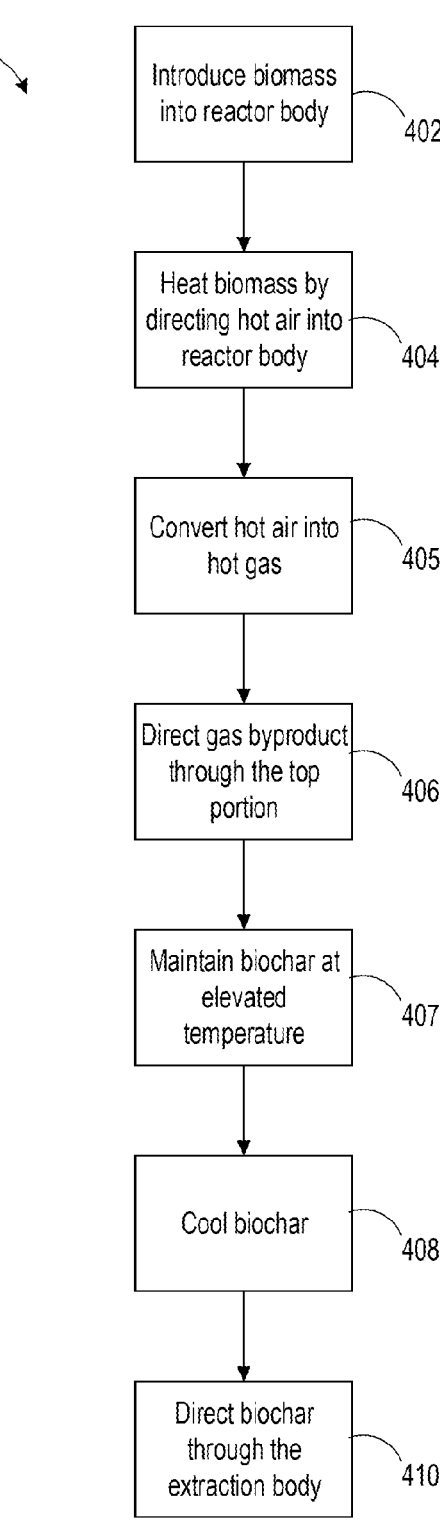
FIG. 4 is flow diagram of a method for producing biochar, according to a particular embodiment.

FIG. 4 is flow diagram of a method 400 to produce biochar, according to a particular embodiments. The method 400 may be implemented, at least in part, by the controller such that reference is made to the controller to aid in explanation of the method 400.

At 402, biomass is introduced into the reactor body 102. In some embodiments, biomass is fed into the reactor body 102 via the receiving portion (e.g., a biomass inlet). The receiving portion may include a valve, door, or other type of device (e.g., a metering device) capable of metering the flow of biochar (e.g., prevent flow or allowing flow, selectively permitting the flow) into the reactor body 102. The controller may be coupled with the metering device to allow or prevent the flow of biomass into the reactor body 102 based on various characteristics of the biochar production system 100. For example, the controller may receive information from one or more sensors positioned on or in the reactor body 102 regarding the bed level (e.g., amount) of the biomass within the reactor body 102. If the information indicates that the bed level within the reactor body 102 is too high (e.g., above an upper threshold), the controller may not allow biomass to enter the reactor body 102 via the receiving portion by setting the metering device to a closed position. If the information indicates that the bed level within the reactor body 102 is too low (e.g., below a lower threshold), the controller may allow biomass to enter the reactor body 102 via the receiving portion by setting the metering device to an open position.

At 404, the biomass is heated by directing hot air into the reactor body 102. In some embodiments, the hot air is produced by partial combustion of the biochar and/or pyrolysis gases. For example, air is directed through the conduit manifold 106 to increase the temperature of the oxidation zone 114. In some embodiments, the controller determines the pressure and/or velocity of the hot air that enters the reactor body 102. For example, the controller may determine that the temperature of the oxidation zone 114 is too low (e.g., below a lower threshold) via information from one or more sensors positioned on or in the reactor body 102 regarding the temperature within the reactor body 102. In response, the controller may increase the pressure and/or velocity of the hot air entering the reactor body 102 such that the amount of hot air entering the reactor body 102 is increased, thereby increasing the temperature of the oxidation zone 114. The controller may also determine that the temperature of the oxidation zone 114 is too high (e.g., above an upper threshold) via information from one or more sensors positioned on or in the reactor body 102 regarding the temperature within the reactor body 102. In response, the controller may decrease the pressure and/or velocity of the air entering the reactor body such that the amount of air entering the reactor body 102 is decreased, thereby decreasing the temperature of the oxidation zone 114.

At 405, the hot air is converted to hot biogas. Specifically, as the biomass increases in temperature, the biomass undergoes a chemical reaction that breaks down the biomass into biochar and gas (e.g., biogas) In some embodiments, the gas can be used as fuel for various machines (e.g., vehicles, manufacturing equipment, etc.).

At 406, the gas byproduct generated from converting biomass to biochar is directed through the top portion 110. For example, as the biomass is converted to biochar and gas, the gas rises through the reactor body 102. When the gas reaches the top portion 110, the gas is directed out of the top portion 110 via a pipe, tube, channel, or other type of device configured to direct gas away from the top portion 110 and toward a gas collection portion.

At 407, the biochar is maintained at an elevated temperature for a period of time to remove any additional impurities that may remain after the previous steps have been completed.

At 408, the biochar is cooled. For example, as the biomass is converted to biochar, the biochar moves from the bake zone 112 to the quench zone 122. In the quench zone 122, the biochar is cooled by, for example, spraying liquid (e.g., water, etc.) on the biochar to reduce the temperature of the biochar to approximately one hundred degrees Celsius. In some embodiments, the biochar is cooled at least partially in the bake zone 112. In some embodiments, the cooling process is controlled by the controller. For example, the controller may determine various characteristics of the liquid sprayed on biochar (e.g., temperature, pressure, flow rate, etc.) such that the temperature of the biochar is reduced appropriately.

At 410, the biochar is directed through the extraction body 104. For example, when the biochar enters the extraction body 104, the biochar contacts a metering device (e.g., an augur, conveyor, etc.) that controls the rate at which the biochar exits the biochar production system 100 through the extraction body 104. The controller may determine the speed at which the metering device operates based on various characteristics of the biochar production system 100. For example, the controller may determine that the rate at which biochar is being directed out of the biochar production system 100 is too slow (e.g., below a lower threshold). In response, the controller may increase the speed of the metering device (e.g., increase augur rotational speed, increase linear conveyor speed, etc.) to direct cool biochar out of the extraction body 104 to allow for more biomass to be fed into the biochar production system 100. The controller may determine that the rate at which biochar is being directed out of the biochar production system 100 is too fast (e.g., above an upper threshold). In response, the controller may decrease the speed of the metering device to direct less cool biochar out of the extraction body 104.

For the purpose of this disclosure, the term "coupled" means the joining or linking of two members directly or indirectly to one another. Such joining may be stationary or moveable in nature. For example, a propeller shaft of an engine "coupled" to a transmission represents a moveable coupling. Such joining may be achieved with the two members or the two members and any additional intermediate members.

Although the diagrams herein may show a specific order and composition of method steps, the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. All such modifications are intended to be included within the scope of the present disclosure as defined in the appended claims. Such variations will depend on the machine-readable media and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

What is claimed is:

1. A system for generating biochar, comprising:
   a reactor body comprising a wall with a first end positioned opposite a second end and defining an opening extending through the reactor body;
   a cover coupled with the second end of the reactor body, the cover configured to direct gas away from the reactor body;
   an extraction cone coupled with the first end of the reactor body, the extraction cone configured to direct biochar away from the reactor body;
   a conduit positioned within the reactor body and extending across the opening, the conduit comprising:
      a first surface defining a slot through which a fluid flows, and a second surface positioned opposite the first surface and between the first surface and the cover;

a metering device positioned within the extraction cone and configured to direct the biochar out of the extraction cone; and a controller configured to receive information regarding rate of biomass through the extraction cone such that (i) if the rate of biomass through the extraction cone is below a lower threshold, the controller increases a speed of the metering device, increasing the rate of biomass through the extraction cone and (ii) if the rate of biomass through the extraction cone is above an upper threshold, the controller decreases the speed of the metering device.

2. The system of claim 1, wherein the conduit comprises a first length and the slot comprises a second length that is smaller than the first length.

3. The system of claim 1, wherein a cross-section of the conduit comprises a first area and the slot comprises a second area that is larger than the first area.

4. The system of claim 3, wherein a ratio of the second area to the first area is greater than or equal to three.

5. The system of claim 1, further comprising:

a biomass inlet in communication with the reactor body and configured to direct biomass into the reactor body; and an agitator extending at least partially through the reactor body, the agitator configured to contact the biomass within the reactor body.

6. The system of claim 5, wherein the agitator comprises:

a rod comprising a first end positioned opposite a second end and defining a vertical axis extending through the rod, the rod extending at least partially through the reactor body and configured to rotate about the vertical axis so as to disrupt the biomass in the reactor body;

a first protrusion coupled to the rod at a first obtuse angle relative to the vertical axis, the first protrusion configured to contact the biomass within the reactor body so as to disrupt the biomass in the reactor body; and a second protrusion coupled to the rod at a second obtuse angle relative to the vertical axis, the second protrusion configured to contact the biomass within the reactor body so as to disrupt the biomass in the reactor body.

7. The system of claim 6, wherein the first obtuse angle is larger than the second obtuse angle.

8. The system of claim 1, wherein the conduit comprises a plurality of conduits extending across the opening, each of the plurality of conduits defining a corresponding slot configured to direct the fluid toward the first end.

9. The system of claim 8, wherein the plurality of conduits are positioned so as to define spaces through which one or more of the biochar and biomass is allowed to pass.

10. The system of claim 1, wherein the extraction cone comprises a wall with a first end positioned opposite a second end and defining an opening extending therethrough, the first end of the extraction cone coupled to the first end of the reactor body, the second end of the extraction cone defining an outlet; and further comprising an outlet cap configured to be selectively attached to and detached from the outlet of the extraction cone such that (i) when the outlet cap is attached to the outlet of the extraction cone, the biochar is not allowed to leave the extraction cone, and (ii) when the outlet cap is detached from the outlet of the extraction cone, the biochar is allowed to leave the extraction cone.

11. A method for generating biochar, comprising:

introducing a biomass into a reactor body via a biomass inlet in communication with the reactor body;

heating the biomass and converting the biomass into biochar and biogas by directing hot air into the reactor body via a conduit;

directing the biogas from the reactor body towards a gas collection portion;

maintaining the biochar at an elevated temperature for a period of time to remove impurities in the biochar;

cooling the biochar in the reactor body or an extraction cone coupled to the reactor body;

directing the biochar through the extraction cone via a first metering device; and controlling a speed of the first metering device via a controller, the controller configured to receive information regarding rate of biomass through the extraction cone such that (i) if the rate of biomass through the extraction cone is below a lower threshold, the controller increases the speed of the first metering device, increasing the rate of biomass through the extraction cone and (ii) if the rate of biomass through the extraction cone is above an upper threshold, the controller decreases the speed of the first metering device, decreasing the rate of biomass through the extraction cone.

12. The method of claim 11, further comprising selectively permitting the biomass to enter the reactor body through the biomass inlet via a second metering device.

13. The method of claim 12, further comprising controlling the second metering device via a controller, the controller configured to receive information from a first sensor coupled to the reactor body regarding amount of biomass in the reactor body such that (i) if the amount of biomass in the reactor body is above an upper threshold, the controller sets the second metering device to a closed position, preventing additional biomass from entering the reactor body through the biomass inlet and (ii) if the amount of biomass in the reactor body is below a lower threshold, the controller sets the second metering device to an open position, allowing additional biomass to enter the reactor body through the biomass inlet.

14. The method of claim 11, further comprising changing a temperature inside the reactor body by changing at least one of a pressure and a velocity of the hot air entering the conduit.

15. The method of claim 14, further comprising controlling the at least one of the pressure and the velocity of the hot air entering the conduit via a controller, the controller configured to receive information from a second sensor coupled to the reactor body regarding the temperature inside the reactor body such that (i) if the temperature inside the reactor body is below a lower threshold, the controller increases the at least one of the pressure and the velocity of the hot air entering the conduit such that more hot air enters the reactor body through the conduit, increasing the temperature inside the reactor body and (ii) if the temperature inside the reactor body is above an upper threshold, the controller decreases the at least one of the pressure and the velocity of the hot air entering the conduit such that less hot air enters the reactor body through the conduit, decreasing the temperature inside the reactor body.

16. The method of claim 11, further comprising changing a temperature, pressure, or flow rate of coolant via a controller such that the biochar is cooled to a temperature of approximately one hundred degrees Celsius.

17. The method of claim 11, wherein the first metering device comprises an augur.

18. The method of claim 11, wherein the first metering device comprises a conveyor.

\*   \*   \*   \*   \*